INVENTOR.
HENRY P. KIRCHNER
BY
Popp and Sommer
ATTORNEYS

3,182,469
WALL STRUCTURE SUITABLE FOR EXPOSURE TO HIGH TEMPERATURE GAS
Henry P. Kirchner, Williamsville, N.Y., assignor to Cornell Aeronautical Laboratory, Inc., Buffalo, N.Y., a corporation of New York
Filed Jan. 5, 1962, Ser. No. 167,997
4 Claims. (Cl. 62—467)

This invention relates to a wall structure suitable for exposure to high temperature gas so as to dissipate heat by radiative transport from the solid-hot gas interface provided therebetween.

It is a known fact that the thermal conductivity of various materials of construction including dielectric, semi-conductive and conductive solids increases with increasing temperature but passes through a maximum and then decreases with further increases in temperature so that at relatively high temperatures, the thermal conductivity may be considered as inversely proportional to the temperature. Accordingly, with the high temperature encountered in certain applications such as in the combustion chambers of rockets and nozzles therefor, and these temperatures are ever increasing with improved rocket fuels being developed, the structural housing elements defining the combustion chamber and rocket nozzle cannot be made of conventional materials of constructional materials of construction having melting points below the combustion temperature encountered and possessing the characteristic of reduced thermal conductivity at such high temperatures.

Efficient use of rocket fuels is critically dependent upon development of new concepts of rocket nozzle design. Since the combustion temperatures will be higher than the melting points of all known materials, it is apparent that these design concepts must provide some way of preventing the nozzle wall temperature from approaching the combustion temperature if nozzle configurations are to be maintained. Extraction of heat from nozzle wall can play an important part in keeping wall temperatures from becoming too high. Composing the wall of a material the thermal conductivity of which is inversely proportional to the temperature, is obviously completely unsatisfactory.

It is accordingly the primary object of the present invention to provide a wall structure suitable for exposure to a high temperature gas and capable of dissipating heat from the solid-hot gas interface so provided in which the solid side of the interface is formed as the boundary surface of a dielectric solid having such properties as to transfer heat away from said interface by radiative transport. In other words the mechanism of thermal radiation, instead of thermal conductivity, is employed to remove heat from the side of the wall which is in contact with the hot gas at a temperature above the melting point of the material of which the wall is composed.

A further important object of the present invention is ot provide such a wall structure which transports heat by radiation from its inner non-ablative surface in direct contact with a hot gas to its outer ablative surface where the heat is absorbed.

Other objects and advantages of the invention will be apparent from the following detailed description of an illustrative embodiment shown in the accompanying drawings wherein.

It will be appreciated that example of a nozzle wall is merely illustrative of a useful application of the present inventive concept and that the invention may be practiced wherever the condition of a solid and gas are in contact with the gas at a temperature higher than the melting point of the solid. For practical purposes, the invention may be considered applicable to a hot gas temperature of at least 3000° R.

Figure 1:
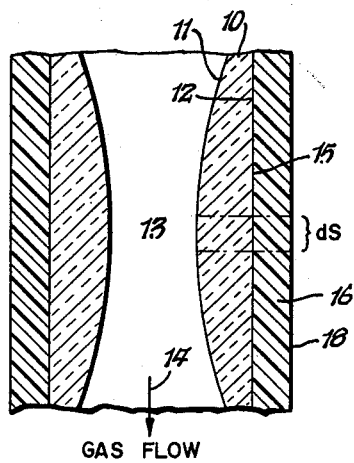
FIG. 1 is a more or less diagrammatic central sectional view through the throat portion of a nozzle for a rocket engine and in which the annular wall of the nozzle is constructed so as to carry out the present invention.

Referring to FIG. 1, the nozzle there illustrated comprises an inner tubular member 10 having an inner surface 11 and an outer surface 12. The passage 13 extending through the member 10 and defined by the contour of the surface 11 may be shaped in cross section as desired. As illustrated, the passage 13 contracts to a relatively narrow throat and thereafter enlarges in the direction of gas flow which is represented by the arrow 14.

The outer surface 12 of the inner member 10 is shown as being cylindrical and contacted by the inner cylindrical surface 15 of an outer member or sleeve 16 having an outer cylindrical surface 18.

Figure 2:
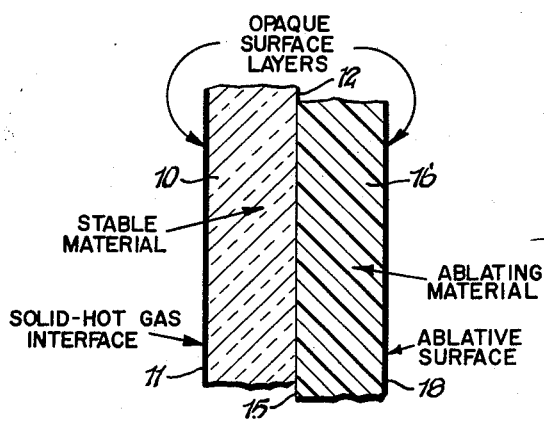
FIG. 2 is an enlarged sectional view of the fragment dS of the wall down to one side of the central axis of the nozzle illustrated in FIG. 1.

Referring to FIG. 2 which illustrates the fragment dS shown in FIG. 1, the member 10 is composed of a high melting point, stable, non-ablative dielectric solid material having a high refractive index and transparent to thermal radiation. Preferably, the inner surface 11 of this member 10 has a layer which is opaque to thermal radiation and provided in a manner hereinafter explained. The other member 16 is composed of an oblating material having a high refractive index substantially equal to that for the stable material of which the member 10 is composed. The outer surface 18 of the ablating body 16 is an ablative surface and it is essential that this surface be opaque to thermal radiation.

The refractive indices of the materials of which the members 10 and 16 are composed, respectively, are the same so that thermal flux will cross the contacting surfaces 12 and 15 and not be reflected from the surface 15 toward the surface 11 which if allowed to occur would reduce the efficiency of thermal transport.

Figure 3:
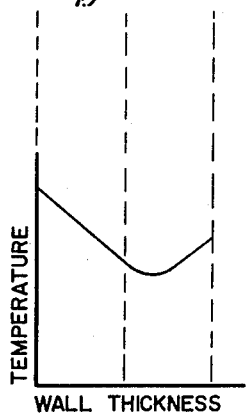
FIG. 3 is a graph illustrating the relationship between the temperature which obtains within the wall section shown in FIG. 2 throughout its thickness.

Heat is radiated from the inner surface 11, preferably opaque, of the member 10 and is absorbed at the opaque outer surface 18 of the ablating layer 16. Heat is also conducted from the inside surface 11 and, after the temperature of the outside surface 18 begins to rise, heat is conducted toward the inside from the outside surface. The result is a temperature profile typically depicted as the curve C shown in FIG. 3 in which the total wall thickness of the wall section shown in FIG. 2 is the abscissa and temperature is the ordinate. Study of this curve will reveal that heat is transported from the inner surface contacting the hot gas to the outer ablative surface.

Thus, the heat transported by radiation can cause the ablation process at the outside surface 18 if the material properties are appropriate for it. Such an ablation process will continue until all of the ablative material has been removed or until the temperature at the interface 12, 15 between the two materials is raised to the point at which bubbles form. When this occurs, radiation will no longer be transmitted efficiently and the nozzle will fail.

The higher the refractive index, the lower the maximum hot face temperature, i.e. the temperature on the surface 11. This effect is particularly pronounced at higher gas stream temperatures with which the invention is concerned. Also, the temperature difference between the gas stream and the hot face 11 increases with increasing refractive index and increasing gas stream temperatures.

The time that the nozzle will function is considered to be limited by the temperature rise of the interface 12, 15 between the stable and ablative material elements 10 and 16, respectively, or by arrival of the ablation front at such interface which is occasioned by removal of all ablative material.

There is a strong relationship among the three variables; the time that the nozzle will function, the refractive index, and the maximum hot face temperature. Longer times result from choice of lower values of refractive index but are accompanied by the disadvantage of higher hot face temperatures. The time that the nozzle will function decreases with increasing gas stream temperature since the initial amount of ablative material is constant and the radiative transport increases strongly with temperature. Accordingly, the most important variables determining the operating time of a given configuration are the gas stream temperature and refractive index.

The stable or non-ablative material element 10 can be made of such materials as vitreous silica, sapphire and refractory glasses, or other suitable materials.

An example of a suitable ablative material to be used for the element 16 is a long chain fluoronated polymer of ethylene such as tetrafluoroethylene.

As was stated hereinabove, it is essential that the outer surface 18 of the ablating element 16 be in the nature of an opaque surface layer. This may be provided by embedding graphite particles in the tetrafluoroethylene which has been heat softened to receive the same. Once the temperature at the surface 11 rises to ablating level, the opaque ablating surface will be self-sustaining.

As was also pointed out hereinabove, while an opaque surface layer may be formed as the inner surface 11 in some cases for more efficient operation because increasing the radiative flux on the internal side of the stable material element 10, such opaque surface layer is not esssential. If vitreous silica is used as the stable material for the element 10, the opaque surface layer may be provided by painting such surface with a platinum loaded with cobalt oxide and coated with an oxidized layer of evaporated chromium. The inner opaque surface layer 11, if used, serves as an efficient emitting material to emit radiant energy toward the outside of the wall. This layer also serves to prevent the radiation from the gas stream from penetrating into the wall.

From the foregoing, it will be seen that the present invention provides a wall structure capable of transferring heat by radiative transport from one surface of a body of stable material covered by a layer of ablative material, through the body and layer to the exposed surface of the latter where the heat is absorbed by this outer ablative surface.

What is claimed is:

1. A wall structure suitable for exposure to a gas having a temperature of more than 3000° R. and capable of dissipating heat from the solid-hot gas interface so provided, comprising a first body composed of non-ablative dielectric solid material transparent to thermal radiation and having one surface providing the solid side boundary of said interface and having another surface remote from said one surface, and a second body composed of ablative material transparent to thermal radiation and having a first surface contacting said another surface and also having an ablative surface remote from said first surface, whereby heat is transferred by radiative transport from said one surface through said bodies to said ablative surface to be absorbed by the latter.

2. A wall structure suitable for exposure to a gas having a temperature of more than 3000° R. and capable of dissipating heat from the solid-hot gas interface so provided, comprising a first body composed of non-ablative dielectric solid material transparent to thermal radiation and having a predetermined refractive index and also having one surface providing the solid side boundary of said interface and further having another surface remote from said one surface, and a second body composed of ablative material transparent to thermal radiation and having a refractive index substantially the same as that for said first body and also having a first surface contacting said another surface and further having an ablative surface remote from said first surface, whereby heat is transferred by radiative transport from said one surface through said bodies to said ablative surface to be absorbed by the latter.

3. A wall structure suitable for exposure to a gas having a temperature of more than 3000° R. and capable of dissipating heat from the solid-hot gas interface so provided, comprising a first body composed of non-ablative dielectric solid material transparent to thermal radiation and having a predetermined refractive index and also having one surface providing the solid side boundary of said interface and further having another surface remote from said one surface, and a second body composed of ablative material transparent to thermal radiation and having a refractive index substantially the same as that for said first body and also having a first surface contacting said another surface and further having a second surface remote from said first surface, said second surface being opaque to thermal radiation, whereby heat is transferred by radiative transport from said one surface through said bodies to said second surface to be absorbed by the latter.

4. A wall structure suitable for exposure to a gas having a temperature of more than 3000° R. and capable of dissipating heat from the solid-hot gas interface so provided, comprising a first body composed of non-ablative dielectric solid material transparent to thermal radiation and having a predetermined refractive index and also having one surface providing the solid side boundary of said interface and further having another surface remote from said one surface, said one surface being opaque to thermal radiation, and a second body composed of ablative material transparent to thermal radiation and having a refractive index substantially the same as that for said first body and also having a first surface contacting said another surface and further having a second surface remote from said first surface, said second surface being opaque to thermal radiation, whereby heat is transferred by radiative transport from said one opaque surface through said bodies to said second opaque surface to be absorbed by the latter.

References Cited by the Examiner
UNITED STATES PATENTS 2,835,107 5/58 Ward _____ 60—35.6
3,014,353 12/61 Scully _____ 62—467
3,022,190 2/62 Feldman.

EDWARD J. MICHAEL, *Primary Examiner.*